No. 831,635. PATENTED SEPT. 25, 1906.
J. STRUNCE.
BEER PIPE CLEANER.
APPLICATION FILED NOV. 17, 1905.
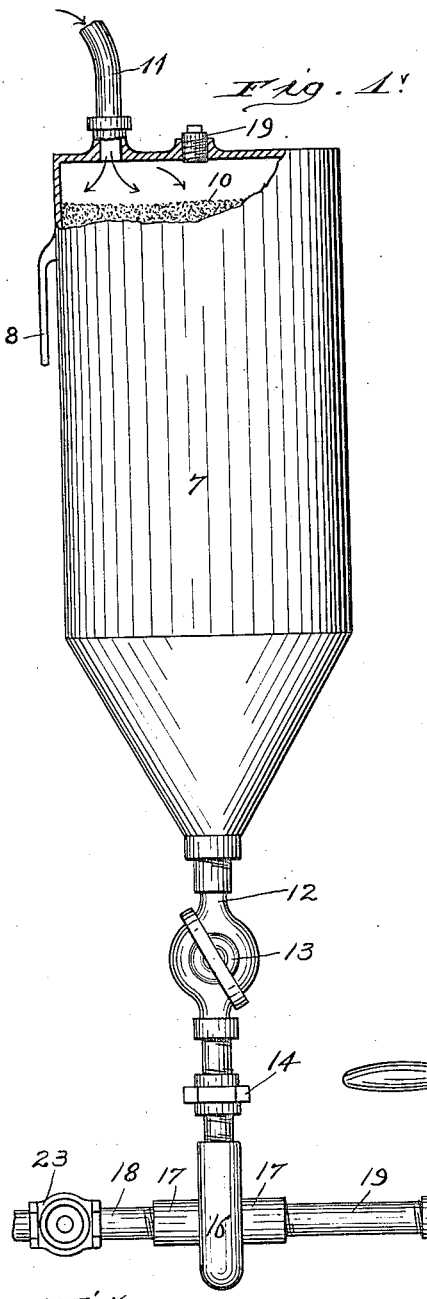
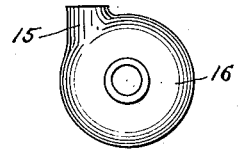
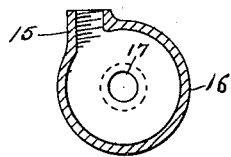
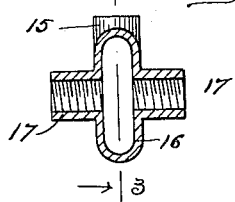
Witnesses:
Chas. E. Gorton.
M. A. Nyman.
Inventor:
Joseph Strunce
By Chas. A. Tillman
Atty.

UNITED STATES PATENT OFFICE.

JOSEPH STRUNCE, OF CHICAGO, ILLINOIS.

BEER-PIPE CLEANER.

No. 831,635.

Specification of Letters Patent.

Patented Sept. 25, 1906.

Application filed November 17, 1905. Serial No. 287,836.

*To all whom it may concern:*

Be it known that I, JOSEPH STRUNCE, a citizen of the United States, residing at Chicago, in the county of Cook and State of Illinois, have invented certain new and useful Improvements in Beer-Pipe Cleaners, of which the following is a specification.

This invention relates to certain new and useful improvements in an apparatus to be used for cleaning pipes, and while it is more especially intended to be employed for cleaning beer-pipes, such as are used for drawing beer from kegs, casks, or vessels, yet it is applicable for cleaning pipes used for other purposes; and it consists in certain peculiarities of the construction, novel arrangements, and operation of the various parts thereof, as will be hereinafter more fully set forth and specifically claimed.

The principal object of the invention is to provide a pipe-cleaner which shall be simple and inexpensive in construction, strong, durable, and effective in operation, and so made that it will be portable and easily connected to or detached from the pipe to be cleaned.

In order to enable others skilled in the art to which my invention pertains to make and use the same, I will now proceed to describe it, referring to the accompanying drawings, in which—

Figure 1 is a view in side elevation of a beer-pipe cleaner embodying my invention, showing portions of pipes used to connect it to a source of water-supply, a source of air under pressure, and to the pipe to be cleaned. Fig. 2 is a detached side view of the mixer for the cleaning substance and water. Fig. 3 is a sectional view thereof, taken on line 3 3 of Fig. 4, looking in the direction indicated by the arrows; and Fig. 4 is a view, partly in section and partly in elevation, of the mixer.

Like numerals of reference refer to corresponding parts throughout the different views of the drawings.

The reference-numeral 7 designates a vessel which may be made of any suitable size, form, and material, but preferably of metal, and has its lower end funnel-shaped, as shown. The vessel 7 has on its outer surface near its upper end an outwardly and downwardly extending projection 8, by means of which it may be supported at a suitable point. The top of the vessel 7 is provided with an opening 9, through which the cleaning material, preferably sand 10, may be inserted into the vessel. Communicating at one of its ends with the upper portion of the vessel 7 is a pipe 11, which communicates at its other end with an air-compressor or a source of air under pressure. (Not shown.) Communicating with the lower end of the vessel 7 is one end of a pipe 12, in which is located a controlling-valve 13, the other end of which is connected by a union-coupling 14 with a tubular portion 15 of the mixer 16, which is circular, as shown, and has on each of its sides an internally-screw-threaded extension 17, to one end of which is secured a pipe 18, which leads from a supply of water under pressure, and the other member 17 has connected thereto a pipe 19, which is provided with a valve 20, used for shutting off or controlling the flow of water and cleaning substance therethrough. Connected to the outer end of the pipe 19, by means of a coupling 21, is a piece of hose 22, which may be connected at its other end to the beer-faucet or to the pipe to be cleaned.

The operation of the device is simple and as follows: A quantity of sand is placed in the vessel 7, when by opening the valves 13 and 20 and supplying compressed air through the pipe 11 to the vessel 7 and water through the pipe 18 it is apparent that the sand will be forced into the mixer 16, and as the water admitted thereto, is also under pressure it will be conveyed through the pipes 19 and 22 into the beer-pipe or other pipe to be cleaned, in which operation the sand and water will be forced through the pipes with considerable pressure and will remove from the interior of the pipes all of the foul matter adhering thereto. After a sufficient quantity of the sand has been used for cutting loose and removing the foul matter or fungus growth caused by the fermented yeast in the beer or otherwise the compressed air may be turned off and the valve 13 closed, when pure water will be forced through the pipes 18 19 22 and pipe to be cleaned, thus removing any sand which may have been left or deposited in the beer-pipe.

By my above-described construction it will be understood that, while I prefer to use sand as a cleansing agent, yet I may substitute therefor other substances, such as sal-soda or any other suitable solvent, and that it will be fed by means of the compressed air into the mixer 16, which is located at a point beyond the cleansing-receptacle, where the operation is taken up by the flow of water, and thus carried through the pipe or pipes to be cleaned.

The water-pipe 18 may be provided with a shut-off valve 23, so that the said pipe may be closed and a cleansing solution forced by air through the pipes 12, 19, and 22 into and through the pipes to be cleaned.

Having thus fully described my invention, what I claim as new, and desire to secure by Letters Patent, is—

The combination with a vessel adapted to contain sand or a cleansing agent and having at its upper end an opening for the admission of the sand or cleansing agent, of a pipe communicating at one of its ends with the upper end of the vessel, a pipe communicating at one of its ends with the lower end of the vessel and provided with a controlling-valve, a mixer consisting of a chambered circular portion having a tubular extension on its periphery and tubular projections on its sides, said tubular extension connected to the lower end of the pipe communicating with the lower end of the vessel, a pipe connected at one of its ends to one of the projections on the mixer, another pipe having a controlling-valve and connected at one of its ends to the other projection on the mixer and adapted to be connected at its other end to the beer pipe or pipes to be cleaned, substantially as described.

JOSEPH STRUNCE.

Witnesses:
CHAS. C. TILLMAN,
M. A. NYMAN.